V. W. KLIESRATH & L. C. CARLTON.
CUFF BUTTON RETAINER.
APPLICATION FILED MAR. 20, 1916.
1,235,575.
Patented Aug. 7, 1917.
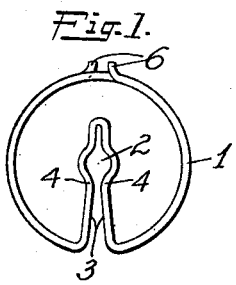
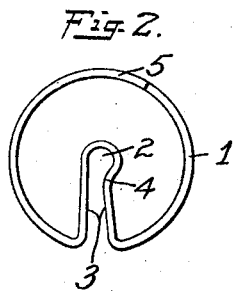
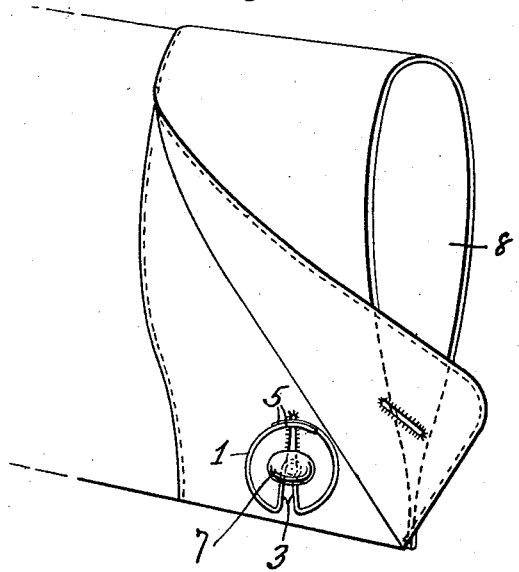
Inventors
Victor W. Kliesrath
& Lee C. Carlton
By their Attorneys

UNITED STATES PATENT OFFICE.

VICTOR W. KLIESRATH AND LEE C. CARLTON, OF PORT WASHINGTON, NEW YORK.

CUFF-BUTTON RETAINER.

1,235,575.  Specification of Letters Patent.  Patented Aug. 7, 1917.

Application filed March 20, 1916. Serial No. 85,377.

*To all whom it may concern:*

Be it known that we, VICTOR W. KLIESRATH and LEE C. CARLTON, both citizens of the United States, residing at Port Washington, county of Nassau, State of New York, have invented certain new and useful Improvements in Cuff-Button Retainers; and we do hereby declare the following to be a full, clear, and exact description of the invention, such as will enable others skilled in the art to which it appertains to make and use the same.

The present invention relates to a cuff button retainer or guard to be forced in position around the shank of a cuff button between the folds of a cuff, for the purpose of preventing the cuff button from accidentally coming out of the cuff. We have found that it is essential in such a device to have the retaining opening, in which the shank is normally located, substantially central of the outer periphery of the device, so that the device may be of comparatively small size and still prevent the cuff button, together with the device, from pulling through the button hole of the cuff in some position to which the device may be turned on the shank. Furthermore, we have found that it is essential to have at least one of the sides of the slot leading to the outer periphery form at the permanently open mouth of the retaining opening a neck which tends to reduce the size of this mouth when the outer periphery of the device is subjected to pressure, so that the device will not be forced from off the shank when the wearer's arm rests on the periphery, although the device may be readily forced into position on the shank and removed therefrom at will.

The cuff button retainer disclosed herein is constructed so as to have the aforesaid characteristics by forming from suitable material a reëntrant slot with sides leading from separated points on the periphery to a substantially central retaining opening, one or both of said sides forming a neck at the mouth of the retaining opening. In the embodiments illustrated, we use spring wire formed so as to increase the tendency of the device to close the retaining opening around the shank of the cuff button when the periphery is subjected to pressure, and also so that the device may be readily placed in position and removed therefrom at will. The wire is so bent, that different lengths thereof form, respectively, a centrally disposed permanently open loop or retaining opening, a substantially concentric guard or operating ring establishing the periphery above mentioned and a plurality of parallel members joining the mouth of the permanently open loop and the mouth of the guard or operating ring; whereby the loop, the guard, and the substantially parallel members combine to form a device which is of novel form and has peculiarities of operation as herein described.

In the accompanying drawings illustrating several embodiments within our invention, Figure 1 shows the retaining device having two convolutions with ends projecting outside of the periphery; Fig. 2 shows the preferred form of the device wherein the end portions of the wire overlap in the outer periphery; and Fig. 3 shows the device of Fig. 2 in retaining position around the cuff button in a folded cuff.

In both of these forms, the device has an outer periphery 1 of substantially circular form and a reëntrant slot having a retaining opening 2 substantially central of the periphery. The sides 3 of the slot merge into the outer periphery at separated points thereof, and also merge into the retaining opening in such manner as to form a neck 4 at one or both sides. Said periphery 1 defines an outer guard or operating ring formed of curved terminal lengths of the strip of spring wire. The retaining opening 2 has a permanently open mouth and is formed by suitably bending and shaping the middle portion of the wire strip. The sides 3 of the slot are formed of lengths of the strip intermediate said middle and terminal portions thereof. The neck or necks 4 are formed by bowing toward its mate one or both of the members or strip lengths forming the sides 3 of the slot. The neck or necks 4 thus form the permanently open mouth of the retaining opening 2.

In Fig. 1, the retaining device is made of two convolutions of spring wire, and has its end portions 5 projecting outwardly of the closed periphery to give a hold for the fingers. The wire is extended beyond the retaining opening 2 to give added resiliency, and there are two necks 4 restricting the permanently open mouth of the retaining opening 2.

In Fig. 2, the end portions of the spring wire overlap in the closed periphery and allow the device to compress under pressure of installing or removing it, and also when the arm rests on the outer periphery.

It will be observed in Fig. 2, that the retaining device is intended to be placed around the shank of a cuff button 7 between the folds of a cuff 8. In installing it in place, the outer periphery is grasped between the fingers and the slot is brought into registry with the shank of the cuff button. In forcing this device around the shank, the sides of the slot give outwardly as a result of the resiliency of the material and allow the shank to pass beyond the neck or necks 4 into the retaining opening 2, whereupon the sides of the slot spring back to normal position and lightly hold the shank in the retaining opening. Owing to the fact that the retaining opening is substantially central of the outer periphery, it is impossible, as a practical matter, for the retaining device to pull through the button hole, irrespective of the position to which the device may be turned. Furthermore, the neck or necks 4 of the slot tend to close the permanent open mouth of the retaining opening when pressure is applied at any place around the outer periphery, thereby preventing the shank from accidentally coming out of the retaining opening in case the arm should rest on the outer periphery, or in case the cuff or retaining device should be suddenly pulled. Although the device is prevented from accidental disengagement from the cuff button, it may be readily removed at will, by pressing it off from the shank while holding one finger against the shank.

It will thus be seen that the essence of the invention as defined in the appended claims, is the provision of a retainer of the kind described formed of a single length of resilient wire, so bent upon itself as to form an inner loop 2 having a permanently open mouth adjacent to a neck or necks 4, an outer guard-ring of considerably greater diameter than the inner loop and forming a circular periphery 1 gapped at a single point only, and a reëntrant slot formed of intermediate lengths of the wire or legs 3. These legs 3 serve to resiliently float the inner loop within the guard-ring forming the periphery 1. The inner ends of the legs 3 are connected to the inner loop at opposite sides of the open mouth thereof, and the outer ends of said legs are connected to the periphery 1 at opposite sides of the single gap therein. By providing a periphery 1 which is closed except at such gap or outer end of the reëntrant slot formed by the legs 3, the shank of the cuff button may be readily forced into the inner loop 2 and removed therefrom; but nevertheless pressure applied to the periphery 1 at any point thereof whatsoever, contracts, without closing, the gap in the periphery and the inner loop 2. In the case of the embodiment of Fig. 2 the provision of merely a single neck 4 increases the reduction of the inner loop upon the application of an inwardly directed radial pressure to the periphery 1, with the result that the shank is more securely retained against dislodgment than if a pair of such necks were provided, as for instance in the embodiment of Fig. 1.

Having thus described our invention, what we claim is:

1. A safety retainer, for use in combination with a cuff button, comprising a single length of resilient wire bent upon itself to form an inner loop having a permanently open mouth and arranged to loosely and yieldingly embrace the shank of the cuff button, a substantially concentric outer guard-ring of considerably larger diameter than the inner loop and forming a circular periphery gapped at a single point only, with such gap arranged opposite the open mouth of the inner loop, and a plurality of substantially parallel legs the inner ends of which are connected to the inner loop at opposite sides of the open mouth thereof, the outer ends of said legs being connected to the circular periphery of the device at opposite sides of the gap therein, said legs thereby forming a reëntrant slot for guiding the shank of the cuff button toward and through the open mouth of the inner loop, said legs also serving to resiliently support the inner loop within the guard-ring; substantially as and for the purposes described.

2. A safety retainer, for use in combination with a cuff button, comprising a single length of resilient wire bent upon itself to form an inner loop having a permanently open mouth and arranged to loosely and yieldingly embrace the shank of the cuff button, a substantially concentric outer guard-ring forming a circular periphery gapped at a single point only, and a pair of substantially parallel legs the inner ends of which are connected to the inner loop at opposite sides of the open mouth thereof, the outer ends of said legs being connected to the circular periphery of the device at opposite sides of the gap therein, said legs thereby forming a guiding slot for such cuff button shank relative to the inner loop, whereby pressure at any point on the guard-ring in a radial direction contracts said gap and thereby contracts the mouth of the inner loop to cause said loop to embrace the cuff button shank more closely; substantially as and for the purpose described.

3. A safety retainer, for use in combination with a cuff button, comprising a single length of resilient wire bent upon itself to form an inner loop having a permanently open mouth and arranged to loosely and yieldingly embrace the shank of the cuff button, a substantially concentric outer guard-ring forming a circular periphery gapped at a single point only, and a pair of substantially parallel legs the inner ends of which are connected to the inner loop at opposite sides of the open mouth thereof, the outer ends of said legs being connected to the circular periphery of the device at opposite sides of the gap therein, said legs thereby forming a guiding slot for such cuff button shank relative to the inner loop, one of said legs smoothly leaving the inner loop and the other leg being bowed toward the first leg to form a neck adjacent to the open mouth of said loop, whereby any one of a plurality of radially directed pressures against the guard-ring tends to move said bowed part to contract the mouth of the inner loop; substantially as and for the purpose described.

In testimony whereof we affix our signatures.

VICTOR W. KLIESRATH.
LEE C. CARLTON.

Copies of this patent may be obtained for five cents each, by addressing the "Commissioner of Patents, Washington, D. C."